United States Patent [19]
Andersson

[11] Patent Number: 5,649,680
[45] Date of Patent: Jul. 22, 1997

[54] JOINT FOR DISMOUNTABLY ATTACHING ADAPTER TO A LAUNCHER WITH SATELLITE

[75] Inventor: Torbjorn Andersson, Vikingstad, Sweden

[73] Assignee: SAAB-Scania Combitech Aktiebolag, Jonkoping, Sweden

[21] Appl. No.: 479,734

[22] Filed: Jun. 7, 1995

[30] Foreign Application Priority Data

Jun. 14, 1994 [SE] Sweden .................................... 9402072

[51] Int. Cl.$^6$ ........................................... B64G 1/62
[52] U.S. Cl. ........................... 244/161; 244/131; 403/333
[58] Field of Search ........................ 244/161, 131; 403/334, 333

[56] References Cited

U.S. PATENT DOCUMENTS

| | | |
|---|---|---|
| 4,848,806 | 7/1989 | Miller .................................... 244/131 |
| 5,197,695 | 3/1993 | Andersson et al. . | |

FOREIGN PATENT DOCUMENTS

| | | | |
|---|---|---|---|
| 49203 | 3/1992 | Japan | 244/161 |
| 49209 | 9/1992 | Japan | 244/161 |
| 49306 | 6/1993 | Japan | 244/161 |
| 49404 | 4/1994 | Japan | 244/161 |

Primary Examiner—Andres Kashnikow
Assistant Examiner—Tien Dinh
Attorney, Agent, or Firm—Lowe, Price, LeBlanc & Becker

[57] ABSTRACT

A joint dismountably attaches an adapter to a launcher with a satellite. The joint includes first and second flanges. At the first flange (1) is formed with at least one surface of revolution forming an angle with a contact plane between the flanges. The second flange is formed with another surface of revolution forming another angle with the contact plane between the flanges. Clamps are formed with a corresponding lower surface of revolution corresponding to the surface of revolution of the first flange, and with an upper surface of revolution corresponding to the surface of revolution of the second flange.

9 Claims, 1 Drawing Sheet

JOINT FOR DISMOUNTABLY ATTACHING ADAPTER TO A LAUNCHER WITH SATELLITE

BACKGROUND OF THE INVENTION

The present invention relates to a Joint for dismountably attaching an adapter to a launcher with satellite, comprising a first substantially circular flange on the adapter and a second flange on the satellite, which flanges are kept together by a number of clamps formed as sectors of a solid of revolution, which clamps are surrounded by a peripherally arranged radially acting tensioning means, the flanges each showing its first surface of revolution sloping outwards, towards a symmectrically formed contact plane between the flanges forming the angles $\alpha 1$ and $\alpha 2$, respectively, the clamps being formed with a lower first surface of revolution corresponding to the first surface of revolution of the first flange and an upper first surface of revolution corresponding to the first surface of revolution of the second flange, the angles $\alpha 1$ and $\alpha 2$ being so chosen that with an increasing axial force trying to separate the first and second flanges at the prevailing Coulomb friction, self-locking cannot occur between the lower first surface of revolution and the first surface of revolution of the first flange and between the upper first surface of revolution and the first surface of revolution of the second flange, respectively.

Joints of this kind have been used for a long time for launching satellites with launcher. The hitherto used embodiments of joints have had certain disadvantages, particularly decreasing tension line load with increasing diameter on the joint and constant radially acting tensioning means. Considering the demand for reasonable dimensions there is a need for a joint of the kind mentioned in the introduction, which shows high load in relation to the geometrical dimensions.

SUMMARY OF THE INVENTION

The object of the present invention is therefore to achieve a joint of the kind mentioned in the introduction, which has a simple construction and shows high load capability in relation to the geometrical dimensions.

According to the invention such a joint is primarily characterized in that the first flange is formed with at least one second surface of revolution forming the angle $\alpha 3$ with said contact plane between the flanges and the second flange is formed with at least one second surface of revolution, forming the angle $\alpha 4$ with said contact plane between the flanges, whereas the clamps are formed with a corresponding lower second surface of revolution corresponding to the second surface of revolution of the first flange and with an upper second surface of revolution corresponding to the second surface of revolution (12) of the second flange, the angles $\alpha 3$ and $\alpha 4$ being 0° or the second surface of revolution sloping outwards, towards the contact plane only so much that with increasing axial force trying to separate the first and second flanges at the prevailing Coulomb friction, self-locking always occurs, the distance between the second surface of revolution of the first flange and the second surface of revolution of the second flange, upon contact between the first and second flanges after said contact plane, being smaller than the distance between the second surfaces of revolution of the clamp.

Several embodiments are possible within the scope of the present invention. It is particularly advantageous if the first flange is formed with a third surface of revolution forming the angle $\alpha 5$ with said contact plane between the flanges, and the second flange is formed with a third surface of revolution forming the angle $\alpha 6$ with said contact plane whereas the clamps are formed with a corresponding lower third surface of revolution corresponding to the third surface of revolution of the first flange and with an upper third surface of revolution corresponding to the third surface of revolution of the second flange, the angles $\alpha 5$ and $\alpha 6$ being 0° or the third surfaces of revolution sloping outwards, towards the contact plane only so much that with increasing axial force acting to separate the first and second flanges at the prevailing Coulomb friction, self-locking always occurs, the distance between the third surface of revolution of the first flange and the third surface of revolution of the second flange, upon contact between the first and second flanges after said contact plane, being smaller than the distance between the third surfaces of revolution of the clamp.

In a further advantageous embodiment of the joint according to the invention said surfaces of revolution are so radially dimensioned and arranged, that with an increasing axial force form-locking contact is obtained substantially simultaneously between on one hand the second surfaces of revolution and on the other hand between the third surfaces of revolution.

BRIEF DESCRIPTION OF THE DRAWINGS

The invention is described in the following with reference to the two accompanying figures, of which FIG. 1 schematically shows an axial cross-section through a portion of a Joint according to the invention, in axially unloaded condition.

PREFERRED EMBODIMENT OF THE INVENTION

Figure 1:
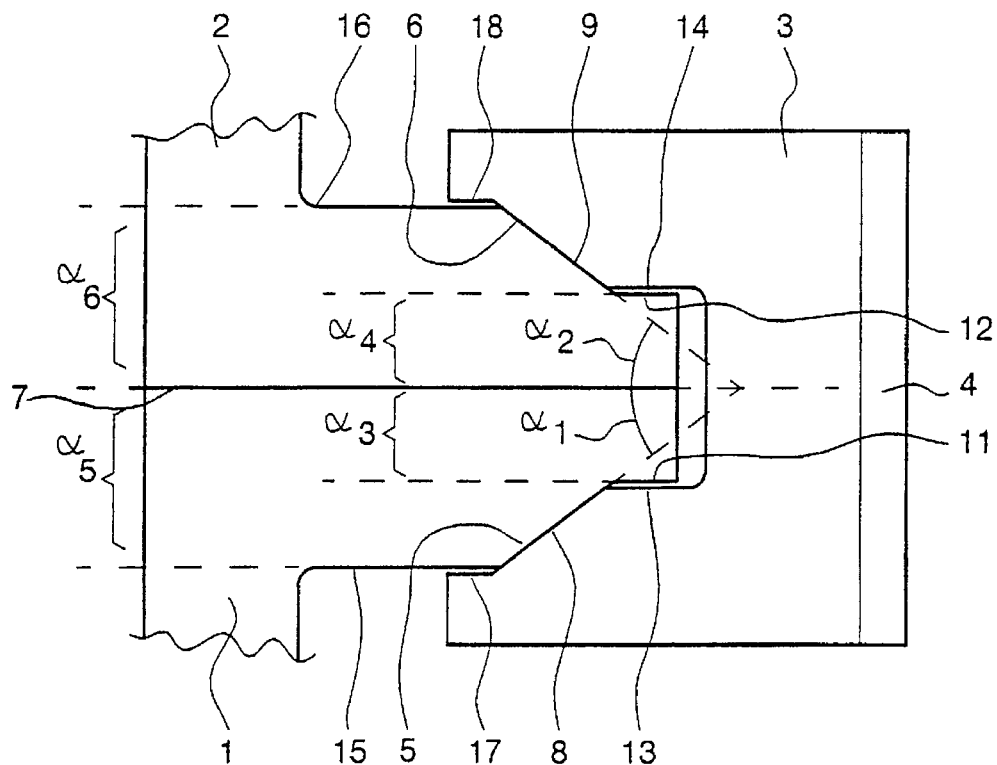
Figure 2:
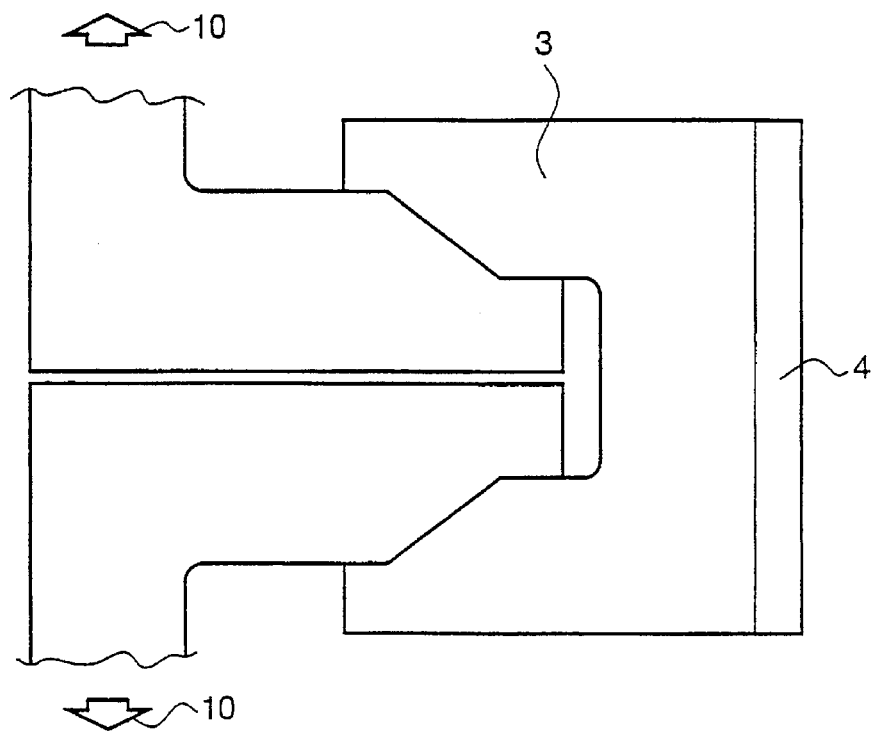
FIG. 2 shows the same object under full axial load.

In the figures a first substantially circular flange on an adapter on top of a launcher is designated by 1 and a second flange on the satellite by 2. Said flanges are kept together by clamps 3, only one of which is shown. These clamps are formed as sectors of a solid of revolution and are surrounded peripherally by a radially acting tensioning means in the form of a ribbon 4, which for example is kept tense by an electro-mechanically opened locking mechanism of the kind described in the United States patent specification U.S. Pat. No. 5,197,695. The flanges each shows its first surface of revolution 5, 6 sloping outwards, towards a symmectrically formed contact plane 7 between the flanges, forming the angles $\alpha 1$ and $\alpha 2$, respectively, with this contact plane. The clamps are formed with a lower first surface of revolution 8 corresponding to the first surface of revolution 5 of the first flange and an upper first surface of revolution corresponding to the first surface of revolution 6 of the second flange. The angles $\alpha 1$ and $\alpha 2$ are so chosen that with increasing axial force 10, trying to separate the first and second flanges, at the prevailing Coulomb friction, self-locking cannot occur between the upper first surface of revolution 8 and the first surface of revolution 5 of the first flange, and between the upper first surface of revolution 9 and the first surface of revolution 6 of the second flange, respectively. In addition to said first surfaces of revolution there are now on either side adjoining these, second and third surfaces of revolution. Then, at the first flange 1, a second surface of revolution 11 forms the angle $\alpha 3$ with the contact plane 7 and at the second flange, a second surface of revolution 12 forms the angle $\alpha 4$ with the contact plane 7. Furthermore, at the first flange, a third surface of revolution 15 forms the angle $\alpha 5$ with the contact plane 7 and at the second flange the third surface of revolution 16 forms the angle α6 with the contact plane 7. The clamp is formed with corresponding surfaces of revolution 13, 14, 17, 18. The angles α3, α4, α5, α6 in the shown example of embodiment are all 0°, but they could be greater than 0° provided that at the prevailing Coulomb friction, self-locking always occurred with increasing axial force 10, trying to separate the first and second flanges. The distance between the second and third surfaces of revolution, respectively, of the first and second flanges, upon contact between the flanges after the contact plane 7, is smaller than the distance between the second and third surfaces of revolution, respectively of the clamps. That is, the distance between the second flange surfaces of revolution 11, 12 is shorter than the distance between the second clamp surfaces of revolution 13, 14, respectively As is evident from the figures, the second and third surfaces of revolution connect directly to the respective first surfaces of revolution, which is an advantageous embodiment of the joint according to the invention.

The Joint works in that with increasing load, that is when an axial force 10 tries to separate the flanges from a starting position 1, in which the flanges are preloaded against each other, the ribbon 4 via the clamps 3, the first surfaces of revolution 5 and 8 and 6 and 9, respectively, slide relative to each other when the clamps move radially outwards until the second and third surfaces of revolution come into contact, form-locking. The embodiment is preferably such that this form-locking contact is obtained substantially simultaneously for the second and third surfaces of revolution, respectively.

With decreasing axial load the procedure is the reverse.

I claim:

1. A joint for dismountably attaching an adapter to a launcher with satellite, comprising a first substantially circular flange (1) on the adapter and a second flange (2) on the satellite, which flanges are kept together by a number of clamps (3) formed as sectors of a solid of revolution, which clamps are surrounded by a peripherally arranged, radially acting tensioning means (4), the flanges each including a first surface of revolution (5, 6) sloping outwards, towards a symmetrically formed contact plane (7) between the flanges, forming angles α1 and α2 with said contact plane, the clamps being formed with a lower first surface of revolution (8) corresponding to the first surface of revolution (5) of the first flange and an upper (9) first surface of revolution corresponding to the first surface of revolution (6) of the second flange, the angles α1 and α2 being so chosen that with an increasing axial force (10) trying to separate the first and second flanges,at a prevailing Coulomb friction, self-locking cannot occur between the lower first surface of revolution (8) and the first surface of revolution (5) of the first flange and between the upper first surface of revolution (9) and the first surface of revolution (6) of the second flange, characterized in that the first flange (1) is formed with at least one second surface of revolution (11) forming an angle α3 with said contact plane (7) between the flanges, and the second flange (2) is formed with at least another second surface of revolution (12), forming an angle α4 with said contact plane (7) between the flanges, whereas the clamps are formed with a corresponding lower second surface of revolution (13) corresponding to the second surface of revolution (11) of the first flange and with an upper second surface of revolution (14) corresponding to the another second surface of revolution (12) of the second flange, the angles α3 and α4 being 0° or the second surfaces of revolution (11, 13, 12, sloping outwards, towards the contact plane (7) only so much that with increasing axial force (10) trying to separate the first and second flanges, at the prevailing Coulomb friction, self-locking always occur, a first distance between the second surface of revolution (11) of the first flange and the another second surface of revolution (12) of the second flange, upon contact between the first and second flanges after said contact plane (7), being smaller than a second distance between the lower and upper second surfaces of revolution (13, 14) of the clamp.

2. Joint according to claim 1, characterized in that the first flange (1) is formed with a third surface of revolution (15) forming an angle α5 with said contact plane (7) between the flanges, and the second flange (2) is formed with a third surface of revolution (16) forming an angle α6 with said contact plane (7), whereas the clamps are formed with a corresponding lower third surface of revolution (17) corresponding to third surface of revolution (15) of the first flange and with an upper third surface of revolution (18) corresponding to another third surface of revolution (16) of the second flange, the angles α5 and α6 being 0° or the third surfaces of revolution (15, 16, 17, 18) sloping outwards, towards the contact plane (7) only so much that with increasing axial force (10) trying to separate the first and second flanges at the prevailing Coulomb friction self-locking always occurs, a third distance between the third surface of revolution (15) of the first flange and the another third surface of revolution (16) of the second flange, upon contact between the first and second flanges after said contact plane (7), being smaller than a fourth distance between the surfaces of revolution (17, 18) of the clamp.

3. Joint according to claim 2, characterized in that said surfaces of revolution (8, 9, 11–18) are so radially dimensioned and arranged that with an increasing axial force (10) form-locking contact is obtained substantially simultaneously between the second surfaces of revolution (11) and (13), and (12) and (14), respectively, and between the third surfaces of revolution (15) and (17) and (16) and (18), respectively.

4. A joint for dismountably attaching an adapter of a launcher to a satellite, comprising:
   a first flange on the adapter having first and second flange surfaces of revolution;
   a second flange on the satellite having third and fourth flange surfaces of revolution; and
   a clamp dismountably attaching said first and second flanges together and having first, second, third and fourth clamp surfaces of revolution, the first and second clamp surfaces of revolution engagable with the first and second flange surfaces of revolution respectively, and the third and fourth flange surfaces of revolution engagable with the third and fourth clamp surfaces of revolution, providing additional load transfer surfaces for dismountably attaching the adapter to the satellite under increased loads and tension, wherein the second and fourth flange surfaces of revolution are shorter than the second and fourth clamp surfaces of revolution, respectively.

5. Joint according to claim 4, wherein said clamp provides a constant tension to said first and second flanges.

6. A joint for dismountably attaching an adapter of a launcher to a satellite, comprising:
   a first flange on the adapter having first and second flange load transfer surfaces;
   a second flange on the satellite having third and fourth flange load transfer surfaces; and
   a clamp dismountably attaching said first and second flanges together and having first, second, third and fourth clamp load transfer surfaces, the first and second clamp load transfer surfaces engagable with the first and second flange load transfer surfaces respectively, and the third and fourth flange load transfer surfaces engagable with the third and fourth clamp load transfer surfaces, providing additional load transfer surfaces further inhibiting dismount of the adapter from the satellite under increased loads and tension, wherein the second and fourth flange load transfer surfaces are shorter than the second and fourth clamp load transfer surfaces, respectively.

7. Joint according to claim 6, wherein said clamp provides a constant tension to said first and second flanges.

8. A joint for dismountably attaching an adapter of a launcher to a satellite, comprising:

a first flange on the adapter having first and second flange surfaces of revolution;

a second flange on the satellite having third and fourth flange surfaces of revolution; and a clamp dismountably attaching said first and second flanges together and having first, second, third and fourth clamp surfaces of revolution, the first and second clamp surfaces of revolution engagable with the first and second flange surfaces of revolution respectively, and the third and fourth flange surfaces of revolution engagable with the third and fourth clamp surfaces of revolution, providing additional load transfer surfaces for dismountably attaching the adapter to the satellite under increased loads and tension, wherein a first distance between the second and fourth flange surfaces of revolution are shorter than a second distance between the second and fourth clamp surfaces of revolution, respectively.

9. A joint for dismountably attaching an adapter of a launcher to a satellite, comprising:

a first flange on the adapter having first and second flange load transfer surfaces;

a second flange on the satellite having third and fourth flange load transfer surfaces; and a clamp dismountably attaching said first and second flanges together and having first, second, third and fourth clamp load transfer surfaces, the first and second clamp load transfer surfaces engagable with the first and second flange load transfer surfaces respectively, and the third and fourth flange load transfer surfaces engagable with the third and fourth clamp load transfer surfaces, providing additional load transfer surfaces further inhibiting dismount of the adapter from the satellite under increased loads and tension, wherein a first distance between the second and fourth flange load transfer surfaces are shorter than a second distance between the second and fourth clamp load transfer surfaces, respectively.

* * * * *